United States Patent
Smith et al.

(10) Patent No.: US 8,606,050 B2
(45) Date of Patent: Dec. 10, 2013

(54) METHOD FOR PROCESSING MULTIPLE IMAGES OF A SAME SCENE

(75) Inventors: Casey Arthur Smith, Grand Junction, CO (US); Andrew Neil Stein, Pittsburgh, PA (US); Bruce Allen Maxwell, Benton, ME (US); Richard Mark Friedhoff, San Francisco, CA (US)

(73) Assignee: Tandent Vision Science, Inc., San Francisco, CA (US)

( * ) Notice: Subject to any disclaimer, the term of this patent is extended or adjusted under 35 U.S.C. 154(b) by 324 days.

(21) Appl. No.: 13/162,192

(22) Filed: Jun. 16, 2011

(65) Prior Publication Data

US 2012/0321222 A1  Dec. 20, 2012

(51) Int. Cl.
*G06K 9/54*  (2006.01)

(52) U.S. Cl.
USPC ............................................. 382/305

(58) Field of Classification Search
USPC .............. 348/135, 218.1, 370, 715, E5.054; 382/168, 286, 305
See application file for complete search history.

(56) References Cited

U.S. PATENT DOCUMENTS

| | | | |
|---|---|---|---|
| 6,563,959 B1 | 5/2003 | Troyanker | |
| 7,596,266 B2 | 9/2009 | Maxwell et al. | 382/167 |
| 7,672,530 B2 | 3/2010 | Friedhoff et al. | 382/266 |
| 7,873,219 B2 | 1/2011 | Friedhoff | 382/199 |
| 8,175,390 B2 * | 5/2012 | Maxwell et al. | 382/190 |
| 2002/0191833 A1 | 12/2002 | Kim | |
| 2004/0151365 A1 | 8/2004 | An Chang et al. | |
| 2007/0176940 A1 | 8/2007 | Maxwell et al. | 345/589 |
| 2009/0034835 A1 | 2/2009 | Maxwell et al. | 382/164 |
| 2010/0111370 A1 | 5/2010 | Black et al. | |
| 2010/0142805 A1 | 6/2010 | Maxwell et al. | 382/164 |
| 2010/0142825 A1 | 6/2010 | Maxwell et al. | 382/199 |
| 2011/0064263 A1 | 3/2011 | De Haan et al. | |
| 2011/0064308 A1 * | 3/2011 | Stein et al. | 382/170 |
| 2011/0170768 A1 * | 7/2011 | Alldrin et al. | 382/159 |

OTHER PUBLICATIONS

Harris and Stephens, "A combined corner and edge detector," *Proceedings of the 4th Alvey Vision Conference*, pp. 147-151, 1988.

B. D. Lucas and T. Kanade, "An iterative image registration technique with an application to stereo vision," *Proceedings of Imaging Understanding Workshop*, pp. 121-130, 1981.

Martin A. Fischer and Robert C. Bolles, "Random Sample Consensus: A Paradigm for Model Fitting with Application to Image Analysis and Automated Cartography," Comm. of the ACM 24: 381395 (Jun. 1981).

Q. T. Luong and O. D. Faugeras, "The Fundamental Matrix, Theory, Algorithms, and Stability Analysis," *International Journal of Computer Vision*, 17(1), pp. 43-75, 1996.

Weis, Yair, "Deriving Intrinsic Images from Image Sequences," ICCV01 (II: 68-75).

* cited by examiner

*Primary Examiner* — Gregory F Cunningham
(74) *Attorney, Agent, or Firm* — Davidson, Davidson & Kappel, LLC; Felix L. D'Arienzo, Jr.

(57) ABSTRACT

In a first exemplary embodiment of the present invention, an automated, computerized method is provided for processing an image. According to a feature of the present invention, the method comprises the steps of providing a sequence of image files depicting images of a same scene, in a computer memory, determining correspondence information relevant to the same scene across the sequence of images, and generating individual intrinsic images for each one of the sequence of images, as a function of the correspondence information.

23 Claims, 12 Drawing Sheets

Image File

METHOD FOR PROCESSING MULTIPLE IMAGES OF A SAME SCENE

BACKGROUND OF THE INVENTION

Many significant and commercially important uses of modern computer technology relate to images. These include image processing, image analysis and computer vision applications. In computer vision applications, such as, for example, object recognition and optical character recognition, it has been found that a separation of illumination and material aspects of an image can significantly improve the accuracy and effectiveness of computer performance. Significant pioneer inventions related to the illumination and material aspects of an image are disclosed in U.S. Pat. No. 7,873,219 to Richard Mark Friedhoff, entitled Differentiation Of Illumination And Reflection Boundaries and U.S. Pat. No. 7,672,530 to Richard Mark Friedhoff et al., entitled Method And System For Identifying Illumination Flux In An Image (hereinafter the Friedhoff Patents).

SUMMARY OF THE INVENTION

The present invention provides an improvement and enhancement to the fundamental teachings of the Friedhoff Patents, and includes a method and system comprising image techniques that accurately and correctly identify intrinsic images corresponding to multiple images of a same scene. The intrinsic images include illumination images and material reflectance images.

In a first exemplary embodiment of the present invention, an automated, computerized method is provided for processing an image. According to a feature of the present invention, the method comprises the steps of providing a sequence of image files depicting images of a same scene, in a computer memory, determining correspondence information relevant to the same scene across the sequence of images, and generating individual intrinsic images for each one of the sequence of images as a function of the correspondence information.

In a second exemplary embodiment of the present invention, a computer system is provided. The computer system comprises a CPU and a memory storing a sequence of image files depicting images of a same scene. According to a feature of the present invention, the CPU is arranged and configured to execute a routine to determine correspondence information relevant to the same scene across the sequence of images, and generate individual intrinsic images for each one of the sequence of images as a function of the correspondence information.

In a third exemplary embodiment of the present invention, a computer program product, disposed on a non-transitory computer readable media is provided. The computer program product includes computer executable process steps operable to control a computer to: provide a sequence of image files depicting images of a same scene, in a computer memory, determine correspondence information relevant to the same scene across the sequence of images, and generate individual intrinsic images for each one of the sequence of images as a function of the correspondence information.

In accordance with yet further embodiments of the present invention, computer systems are provided, which include one or more computers configured (e.g., programmed) to perform the methods described above. In accordance with other embodiments of the present invention, non-transitory computer readable media are provided which have stored thereon computer executable process steps operable to control a computer(s) to implement the embodiments described above. The present invention contemplates a computer readable media as any product that embodies information usable in a computer to execute the methods of the present invention, including instructions implemented as a hardware circuit, for example, as in an integrated circuit chip. The automated, computerized methods can be performed by a digital computer, analog computer, optical sensor, state machine, sequencer, integrated chip or any device or apparatus that can be designed or programmed to carry out the steps of the methods of the present invention.

BRIEF DESCRIPTION OF THE DRAWINGS

FIG. 2 shows an N×M pixel array image file for an image stored in the computer system of FIG. 1.

DETAILED DESCRIPTION OF THE PREFERRED EMBODIMENTS

Figure 1:
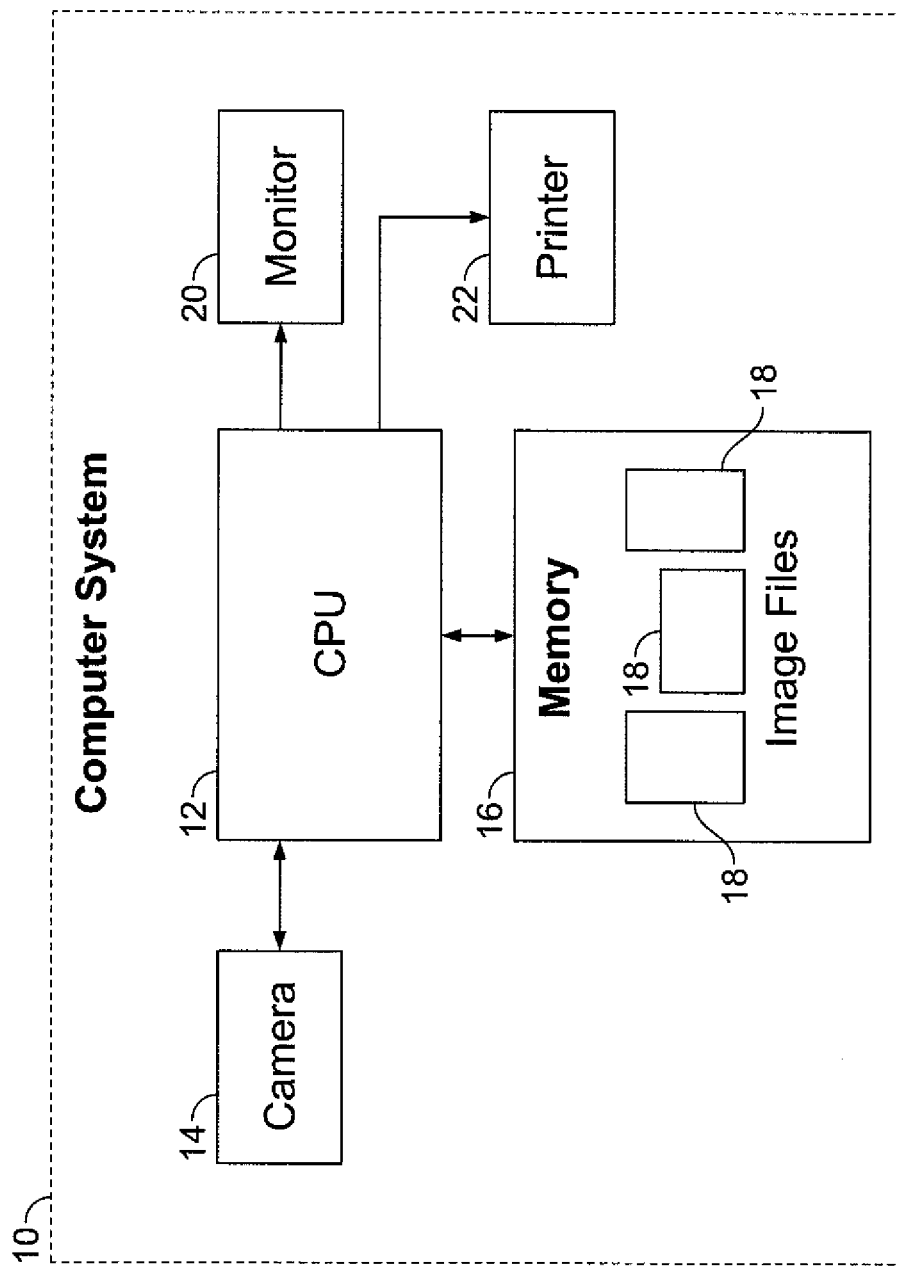
FIG. 1 is a block diagram of a computer system arranged and configured to perform operations related to images.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to take multiple images of a same scene or a video, and can be operated at a stationary position or while moving. The camera 14 downloads images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

As shown in FIG. 2, each image file 18 comprises an N×M pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electro-magnetic spectrum. The pixel array includes n rows of m columns each, starting with the pixel p (1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

In an image operation, the CPU 12 operates to analyze the RGB values of the pixels of a stored image file 18 to achieve various objectives, such as, for example, to identify regions of an image that correspond to a single material depicted in a scene recorded in the image file 18. A fundamental observation underlying a basic discovery of the present invention, as disclosed in the Friedhoff Patents, is that an image comprises two components, material and illumination. All changes in an image are caused by one or the other of these components. A method for detecting one of these components, for example, material, provides a mechanism for distinguishing material or object geometry, such as object edges, from illumination and shadow boundaries.

Such a mechanism enables techniques that can be used to generate intrinsic images. The intrinsic images correspond to an original image, for example, an image depicted in an input image file 18. The intrinsic images include, for example, an illumination image, to capture the intensity and color of light incident upon each point on the surfaces depicted in the image, and a material reflectance image, to capture reflectance properties of surfaces depicted in the image (the percentage of each wavelength of light a surface reflects). The separation of illumination from material in the intrinsic images provides the CPU 12 with images optimized for more effective and accurate further processing in such applications as computer vision.

U.S. Patent Application Publications 2010/0142805 and 2010/0142825 disclose methods that utilize the fundamental teachings of the Friedhoff Patents in a spatio-spectral operator/constraint/solver model for a computer operation to generate intrinsic images form an original image. According to features of the inventions disclosed in the cited patent publications, spatio-spectral operators are generated to facilitate a process for the segregation of illumination and material aspects of a scene depicted in an image file 18.

Spatio-spectral operators comprise representations or characteristics of an image that encompass spatio-spectral information usable in the processing of material and illumination aspects of an image. The spatio-spectral operators are subject to constraints that define constraining spatio-spectral relationships between the operators, for input to a solver. The solver includes a mathematical processing engine that operates to obtain an optimized solution for the generation of an intrinsic image, such as a material image and/or an illumination image derived from the original image stored in an image file 18, as a function of the constraining relationships between the spatio-spectral operators.

According to a feature of the present invention, the methods of the cited patent publications are extended to the scenario where multiple images of a same scene are to be processed. A scene can be defined in terms of a same object, that is, multiple images of a single object such as a building, or a group of objects depicted within the scene. In general, this scenario occurs, for example, when there are multiple images depicting multiple views of a same scene, potentially from widely-spaced viewpoints, as can occur when modeling an environment for a graphics application. Another example is a sequence of images closely spaced in time and space as occurs in video data generated by a stationary or moving camera.

Execution of methods to generate intrinsic images can be performed for each of the multiple images as a function of information gathered form across the set of multiple images. The use of information relevant to the entire set of multiple images assures correspondence between each same scene patch, as depicted in the several different views, and provides consistent results across the set of images.

According to features of the inventions disclosed in the cited patent publications, spatio-spectral operators include, for example, tokens, token map information, log chromaticity representation values, X-junctions and BIDR model representations.

A token is a connected region of an image wherein the pixels of the region are related to one another in a manner relevant to identification of image features and characteristics such as an identification of materials and illumination. The use of tokens recognizes the fact that a particular set of material/illumination/geometric characteristics of an image extends beyond a single pixel, and therefore, while the image processing described herein can be done on a pixel level, tokens expedite a more efficient processing of image properties. The pixels of a token can be related in terms of either homogeneous factors, such as, for example, close correlation of color among the pixels, or inhomogeneous factors, such as, for example, differing color values related geometrically in a color space such as RGB space, commonly referred to as a texture. The present invention utilizes spatio-spectral information relevant to contiguous pixels of an image depicted in an image file 18 to identify token regions. The spatio-spectral information includes spectral relationships among contiguous pixels, in terms of color bands, for example the RGB values of the pixels, and the spatial extent of the pixel spectral characteristics relevant to a single material.

According to one exemplary embodiment of the present invention, tokens are each classified as either a Type A token, a Type B token or a Type C token. A Type A token is a connected image region comprising contiguous pixels that represent the largest possible region of the image encompassing a single material in the scene (uniform reflectance). A Type B token is a connected image region comprising contiguous pixels that represent a region of the image encompassing a single material in the scene, though not necessarily the maximal region of uniform reflectance corresponding to that material. A Type B token can also be defined as a collection of one or more image regions or pixels, all of which have the same reflectance (material color) though not necessarily all pixels which correspond to that material color.

A Type C token comprises a connected image region of similar image properties among the contiguous pixels of the token, for example, similar color and intensity relative to a single, robust color measurement, where similarity is defined with respect to a noise model for the imaging system used to record the image. Type C tokens are used for efficiency in mathematical calculations and accuracy in color measurements. By using Type C tokens, an image to be processed is divided into regions (the Type C tokens) of contiguous pixels having similar color and intensity characteristics. Thus, for processing purposes, each token is analyzed as a single unit rather than the more time consuming analysis of each of the individual constituent pixels of the respective token. Moreover, the color of each token is calculated as the average of the substantially similar constituent pixels, to provide a more robust color measurement for use in the processes of the exemplary embodiments of the present invention.

A linear token is a nonhomogeneous token comprising a connected region of the image wherein adjacent pixels of the region have differing color measurement values that fall within a cylinder in RGB space, from a dark end (in shadow) to a bright end (lit end), along a positive slope. The cylinder configuration is predicted by a bi-illuminant dichromatic reflection model (BIDR model), according to a feature of the present invention, when the color change is due to an illumination change forming a shadow (i.e. a decrease in the intensity of the incident illuminant as the interplay between the incident or direct illuminant and the ambient illuminant in the illumination field) over a single material of a scene depicted in the image.

For purposes of describing, identifying and using linear tokens, the BIDR model can be stated as: $I_{(x, y, z, \theta, \phi, \lambda)} = c_b(\lambda) l_d(\lambda) \gamma_b + M_a(\lambda) c_b(\lambda)$, where: $I_{(x, y, z, \theta, \phi, \lambda)}$ is the radiance of a surface point at (x, y, z) in the direction $\theta$, $\phi$ for the wavelength $\lambda$, $c_b(\lambda)$ is the geometry independent body reflectance of a surface for the wavelength $\lambda$, $l_d(\lambda)$ is the incident illuminant for the wavelength $\lambda$. $\gamma_b$ is the product of a shadow factor $s_{x, y, z}$ and a geometric factor $m_b(\theta i)$, and $M_a(\lambda)$ is the integral of the ambient illuminant and geometric body reflectance over a hemisphere, excluding the incident illuminant. For more detailed information on the BIDR model, reference should be made to U.S. application Ser. No. 11/341,751, filed Jan. 27, 2006, entitled: "Bi-illuminant Dichromatic Reflection Model For Image Manipulation," published as US 2007/0176940 on Aug. 2, 2007.

Token map information indicates locations of tokens within an image, relative to one another. The map information is used to identify neighboring tokens for performing an analysis of token neighbor relationships relevant to constraining spatio-spectral relationships between tokens, for input to the solver.

Log chromaticity representation values provide illumination invariant values for pixels of the image. Logarithmic values of the color band values of the image pixels are plotted on a log-color space graph. The logarithmic values are then projected to a log-chromaticity projection plane oriented as a function of the BIDR model. The chromaticity plane values are substituted for the color band values (for example, RGB values) of each pixel. For more detailed information on log chromaticity representation values, reference should be made to U.S. Pat. No. 7,596,266, entitled: "Method And System For Separating Illumination And Reflectance Using a Log Color Space."

An X-junction is an area of an image where a material edge and an illumination boundary cross one another. An X-junction is an optimal location for an accurate analysis of material and illumination aspects of an image.

Constraints comprise, according to features of the inventions disclosed in the cited patent publications, an anchor constraint, a same illumination constraint, a smooth illumination constraint, a same material constraint, a Linear token constraint, a BIDR enforcement constraint, a log chromaticity similarity constraint, and an X junction constraint. Each constraint is configured as a constraint generator software module that defines the spatio-spectral operators utilized by the respective constraint and provides an expression of the constraining relationship imposed upon the constituent operators.

An anchor constraint anchors the illumination or material reflectance of a token or pixel to a specified value. For example, anchor constraints can be created for a number of the brightest/largest Type C tokens in an image, constraining each to have a reflectance equal to the observed color in the image. Applying the constraints in this example would follow from an assumption that the brightest/largest tokens are fully lit by white light. Additionally, if other constraints only specify the relative material reflectance values or illumination values of tokens, anchor constraints can help specify the absolute value of the reflectance or illumination in the image.

A same illumination constraint utilizes Type C tokens and Type B tokens identified in an image and token map information. The constraining relationship is that adjacent Type C tokens, as indicted by the token map information, are at the same illumination, unless the adjacent Type C tokens are part of the same Type B token. The term "same" in connection with the term "illumination" is used to mean an average value with respect to a noise model for the imaging system used to record the image. This constrains any observed differences in appearance between adjacent Type C tokens, that are not part of the same Type B token, to be a material change.

In a smooth-illumination constraint, the constraint is based upon the average illumination of the pixels near a shared boundary between adjacent Type C tokens. This constrains the illumination field to be somewhat smooth, as opposed to piecewise constant throughout a token.

A same material or Type B token constraint also utilizes Type C tokens and Type B tokens. However, the constraining relationship is that all Type C tokens that are part of the same Type B token are constrained to be of the same material. This constraint enforces the definition of a Type B token, that is, a connected image region comprising contiguous pixels that represent a region of the image encompassing a single material in the scene, though not necessarily the maximal region corresponding to that material. Thus, all Type C tokens that lie within the same Type B token are by the definition imposed upon Type B tokens, of the same material, though not necessarily of the same illumination. The Type C tokens are therefore constrained to correspond to observed differences in appearance that are caused by varying illumination.

Accordingly, the Type B token constraint is complementary to the same and smooth illumination constraints, which, as opposed to illumination change, constrain observed differences to correspond to material change, as described above. This is due to the fact that in each of the same and smooth illumination constraints, Type C tokens that are adjacent and not part of the same Type B token, are constrained to the same illumination. These Type C tokens should comprise different materials, since by the constraint, they are not in the same Type B token and therefore, by the definition of Type B tokens enforced by the constraint, do not encompass a single material, so illumination should be a constant, and any observed difference is considered as attributable to a material change.

To summarize, pursuant to a feature of the inventions disclosed in the cited patent publications, the Type C and Type B token spatio-spectral operators are defined to provide characteristics of an image that enable segregation of illumination and material. Type C tokens each comprise a connected image region of similar image properties, for example similar color, as recorded and stored in an image file 18. Thus, adjacent Type C tokens indicate some form of change in the image or else they would form the same Type C token. Type B tokens encompass a single material. The complementary constraints of the same/smooth illumination constraints and the Type B token constraint enforce relationships between the tokens that indicate either a material change or an illumination change.

If the adjacent Type C tokens are within the same type B token, as in the Type B token constraint, the differences between them should correspond to illumination change due to the same material property of the common Type B token. If the adjacent Type C tokens are not within the same Type B token, as in the same/smooth illumination constraints, the difference between them should then correspond to a material change since they are not both defined by a common, single material Type B token.

A linear token constraint utilizes Type C tokens and linear tokens. The constraining relationship is that a difference between two Type C tokens, spaced by a linear token, approximately equals a characteristic illuminant spectral ratio for the image. As defined, a linear token follows a cylinder configuration along a positive slope, through color space. The BIDR model predicts that the color difference between the dark end and bright end equals the characteristic illuminant spectral ratio for the image. Thus, the color difference between two Type C tokens, one at each of the dark end and bright end of a linear token, should reflect the value of the characteristic illuminant spectral ratio for the image because a linear token captures an illumination transition on a single material. The Type C tokens under the linear token are all the same material and can be constrained to be the same material.

A BIDR enforcement constraint utilizes Type C tokens and a BIDR model defined normal vector for the log-chromaticity projection plane. The constraining relationship is that the illumination for all Type C tokens in a local patch of the image form line in log-color space, the orientation of the line being defined by the BIDR model defined normal vector. The constraint therefore enforces the illumination field present in the image to explicitly fit the BIDR model prediction for the illumination.

Thus, each of the linear token constraint and the BIDR enforcement constraint utilize BIDR model predictions as a basis to segregate illumination and material aspects of an image. The BIDR model predicts a color change in an image when the color change is due to an illumination change forming a shadow (i.e. a decrease in the intensity of the incident illuminant as the interplay between the incident or direct illuminant and the ambient illuminant in the illumination field) over a single material of a scene depicted in the image. The color change prediction of the BIDR model accurately constrains all color band variations among Type C tokens to illumination field effects occurring in an image by operating as a function of the interplay between the spectral variations occurring between incident illuminant and ambient illuminant components of the illumination field. Thus, BIDR model based constraints couple all color band variations into one integral constraining relationship. The BIDR model constraint makes certain that the illumination field goes from ambient to fully lit, preventing material-dependent changes in the illumination color.

A log chromaticity similarity constraint utilizes Type C tokens and log chromaticity representation values. The constraining relationship is that those Type C tokens having pixels with similar log chromaticity representation values are constrained to a same material color value, with observed differences being attributed to variations in the illumination field.

An X-junction constraint utilizes Type C tokens and X-junction operators. As noted above, an X-junction is an area of an image where a material edge and an illumination boundary cross one another. X-junctions are typically formed by four Type C tokens, two pairs of same material Type C tokens forming the material edge, with each same material pair including an illumination boundary dividing the same material into lit and shadowed pairs of Type C tokens. The constraining relationship: 1) a same material constraint is imposed between each same material pair of Type C tokens forming the X-junction (those with an illumination boundary between them), and 2) a same illumination constraint is imposed between each pair of Type C tokens forming the material edge of the X-junction. For a more detailed description of X-junctions and the relationships of constituent tokens, reference should be made to U.S. Pat. No. 7,672,530, entitled: "Method And System For Identifying Illumination Flux In An Image."

An exemplary solver according to a feature of the inventions disclosed in the cited patent publications, comprises a mathematical processing engine for executing an optimizing function, for example, optimization of results in an equation expressed by: [A][x]=[b], where [A] is a matrix of values that are to be satisfied by (and therefore, taken as solved for by) the definitions of the operators and the constraining relationships of selected constraints, [x] is a matrix of variables for which the equation is finding an optimal solution, for example, one of an illumination or material component of a pixel or token, and [b] is a matrix of known or specified values, such as, for example, values observed in an image selected for processing, for example, the recorded values for the RGB color bands of each pixel of an image file 18.

Other bases for the matrix [b]:

a general anchor constraint where [b] can be any specified value, indicating that the material color of a token should be the value in [b], where that value could be the value from the image, or any value specified by the user, such as, for example, in the case human faces a user can specify a value of 0.4 for skin tokens (such that all faces come out to a reasonable intensity for storage as in image).

a same material constraint, where the value in [b] is 0, and the equation involved is specifying that the difference between the material colors of the two tokens is 0.

a same illumination constraint where the value in [b] is the difference between the two colors measured for each token in the original image, and the equation involved indicates that the difference between the two tokens in the original image is the difference in their material colors (which means the difference in the illumination is 0).

a smooth illumination constraint, where the value in [b] is some value calculated from the original image, either as the output of a filter response such as in smooth illumination or the average of the difference of the nearby pixels as in the other version of smooth illumination constraints.

In the exemplary solver, the optimizing equation can be implemented in a mathematical optimizing function selected from a set of known optimization solvers such as, for example, known convex optimization operations such as a least squares solver, or a preconditioned conjugate gradient solver.

According to a feature of the present invention, correspondence information is identified, for example, matching pixels or Type C tokens of a same scene recorded in a sequence of multiple images, for use in further processing of the multiple images, for example, the generation of intrinsic images. The match indicates the parts or features of one image, as depicted by pixels or Type C tokens in a first image of the sequence of images, that correspond to the same parts or features of the same scene, as depicted by corresponding pixels or Type C tokens in a subsequent image of the sequence of images. The following description, in general, provides examples of techniques for identifying matches between two images. However, the disclosed techniques can be applied to any number of images in a sequence. Moreover, the following description is in terms of an exemplary red, green, blue (RGB) color space. However, the disclosed techniques can be applied to any number of color bands sampled from any distribution in the electromagnetic spectrum, such as, for example, (yellow, magenta, cyan), (red, green, blue, emerald), or (infrared, red, green, blue).

In an exemplary embodiment of the present invention, the identified correspondence information for the sequence of images of a same scene is applied by the CPU 12 in processing the sequence of images to generate intrinsic images. For example, the CPU 12 can implement an anchor constraint between matching Type C tokens such that the reflectance of a token in a second image is constrained to the reflectance of the corresponding token in a first image of the sequence, and so on.

In a further exemplary embodiment of the present invention, a multi-image solve is executed by the CPU 12. In the multi-image solve, all the Type C tokens of all of the images of a sequence are listed as unknowns in the matrix equations of the solver. A same material constraint can be implemented as a function of corresponding tokens of different images.

In yet another exemplary embodiment of the present invention, each image can be processed independently to generate corresponding intrinsic images, that are then adjusted in a post processing operation such that the reflectance of each of the several material images are matched to one another as a function of the correspondence information. Each of the anchor constraint, multi-image solve and post processing techniques will be described in detail below.

Figure 3A:
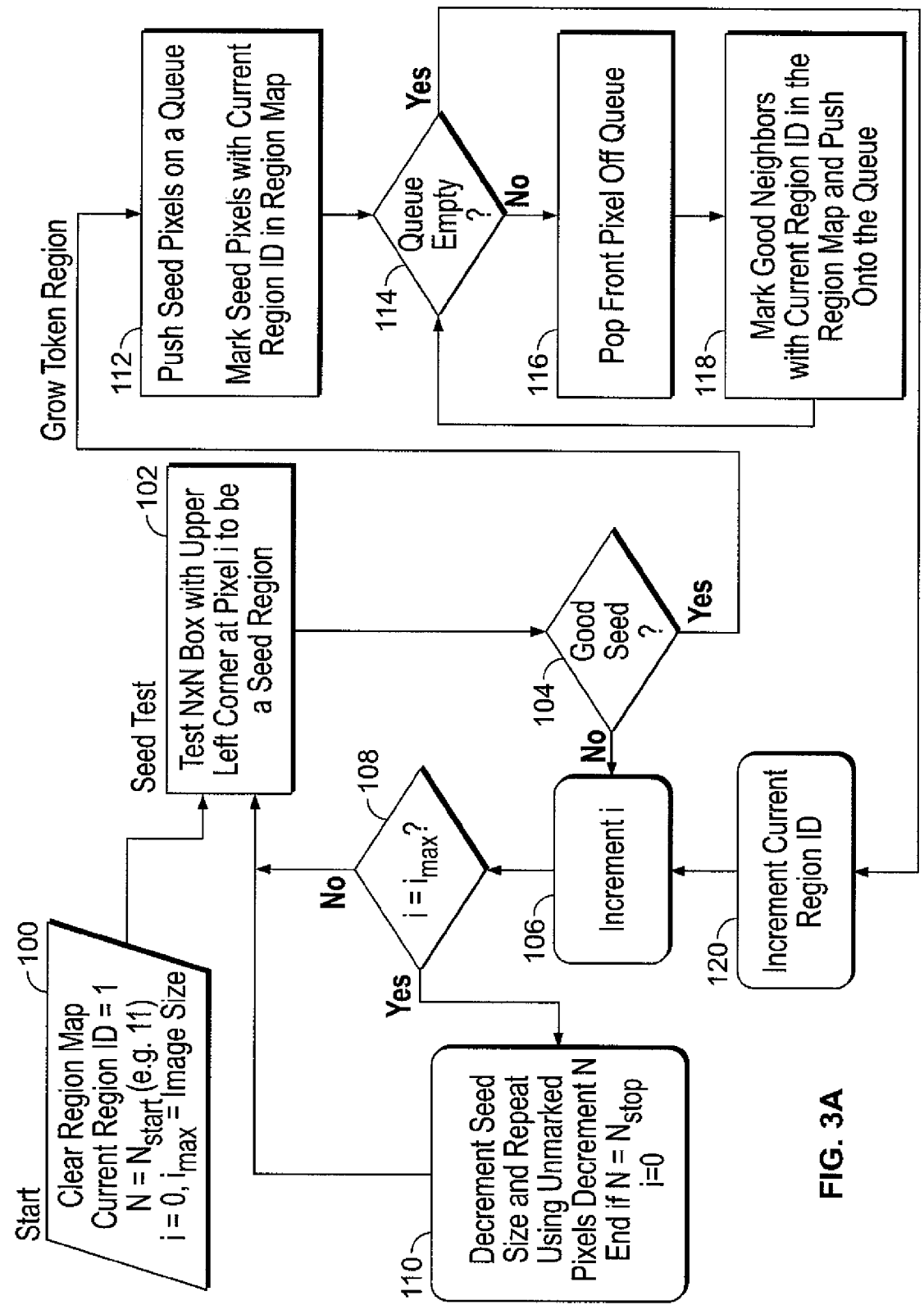
FIG. 3A is a flow chart for identifying Type C token regions in the image file of FIG. 2, according to a feature of the present invention.

Referring now to FIG. 3A, there is shown a flow chart for identifying Type C token regions in the scene depicted in the image file 18 of FIG. 2, according to a preferred exemplary embodiment of the present invention. Type C tokens can be readily identified in each image of a sequence of images depicting a same scene, utilizing the steps of FIG. 3A, and then analyzed and processed as a function of correspondence information, according to a feature of the present invention.

A $1^{st}$ order uniform, homogeneous Type C token comprises a single robust color measurement among contiguous pixels of the image. At the start of the identification routine, the CPU 12 sets up a region map in memory. In step 100, the CPU 12 clears the region map and assigns a region ID, which is initially set at 1. An iteration for the routine, corresponding to a pixel number, is set at i=0, and a number for an N×N pixel array, for use as a seed to determine the token, is set an initial value, N=$N_{start}$. $N_{start}$ can be any integer >0, for example it can be set at set at 11 or 15 pixels.

At step 102, a seed test is begun. The CPU 12 selects a first pixel, i=1, pixel (1, 1) for example (see FIG. 2), the pixel at the upper left corner of a first N×N sample of the image file 18. The pixel is then tested in decision block 104 to determine if the selected pixel is part of a good seed. The test can comprise a comparison of the color value of the selected pixel to the color values of a preselected number of its neighboring pixels as the seed, for example, the N×N array. The color values comparison can be with respect to multiple color band values (RGB in our example) of the pixel. If the comparison does not result in approximately equal values (within the noise levels of the recording device) for the pixels in the seed, the CPU 12 increments the value of i (step 106), for example, i=2, pixel (1, 2), for a next N×N seed sample, and then tests to determine if i=$i_{max}$ (decision block 108).

If the pixel value is at $i_{max}$, a value selected as a threshold for deciding to reduce the seed size for improved results, the seed size, N, is reduced (step 110), for example, from N=15 to N=12. In an exemplary embodiment of the present invention, $i_{max}$ can be set at a number of pixels in an image ending at pixel (n, m), as shown in FIG. 2. In this manner, the routine of FIG. 3A parses the entire image at a first value of N before repeating the routine for a reduced value of N.

After reduction of the seed size, the routine returns to step 102, and continues to test for token seeds. An $N_{stop}$ value (for example, N=2) is also checked in step 110 to determine if the analysis is complete. If the value of N is at $N_{stop}$, the CPU 12 has completed a survey of the image pixel arrays and exits the routine.

If the value of i is less than $i_{max}$, and N is greater than $N_{stop}$, the routine returns to step 102, and continues to test for token seeds.

When a good seed (an N×N array with approximately equal pixel values) is found (block 104), the token is grown from the seed. In step 112, the CPU 12 pushes the pixels from the seed onto a queue. All of the pixels in the queue are marked with the current region ID in the region map. The CPU 12 then inquires as to whether the queue is empty (decision block 114). If the queue is not empty, the routine proceeds to step 116.

In step 116, the CPU 12 pops the front pixel off the queue and proceeds to step 118. In step 118, the CPU 12 marks "good" neighbors around the subject pixel, that is neighbors approximately equal in color value to the subject pixel, with the current region ID. All of the marked good neighbors are placed in the region map and also pushed onto the queue. The CPU 12 then returns to the decision block 114. The routine of steps 114, 116, 118 is repeated until the queue is empty. At that time, all of the pixels forming a token in the current region will have been identified and marked in the region map as a Type C token.

When the queue is empty, the CPU 12 proceeds to step 120. At step 120, the CPU 12 increments the region ID for use with identification of a next token. The CPU 12 then returns to step 106 to repeat the routine in respect of the new current token region.

Figure 3B:
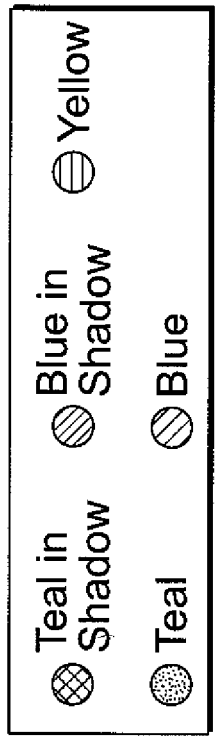
FIG. 3B is an original image used as an example in the identification of Type C tokens.
Figure 3B:
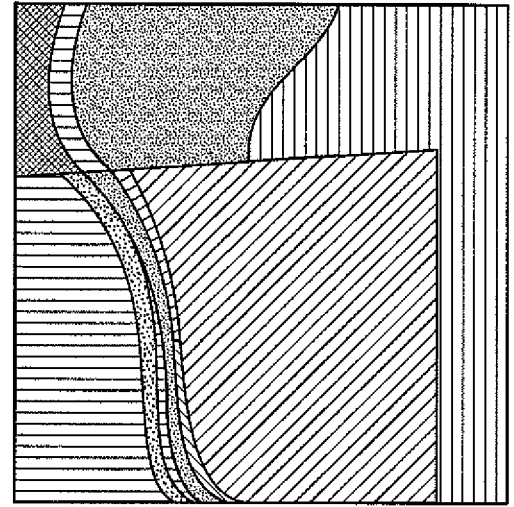
Figure 3C:
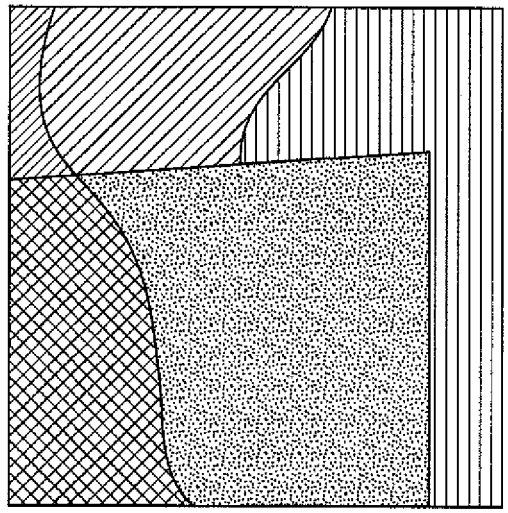
FIG. 3C shows Type C token regions in the image of FIG. 3B.

Upon arrival at N=$N_{stop}$, step 110 of the flow chart of FIG. 3A, or completion of a region map that coincides with the image, the routine will have completed the token building task. FIG. 3B is an original image used as an example in the identification of tokens. The image shows areas of the color blue and the blue in shadow, and of the color teal and the teal in shadow. FIG. 3C shows token regions corresponding to the region map, for example, as identified through execution of the routine of FIG. 3A (Type C tokens), in respect to the image of FIG. 3B. The token regions are color coded to illustrate the token makeup of the image of FIG. 3B, including penumbra regions between the full color blue and teal areas of the image and the shadow of the colored areas.

While each Type C token comprises a region of the image having a single robust color measurement among contiguous pixels of the image, the token may grow across material boundaries. Typically, different materials connect together in one Type C token via a neck region often located on shadow boundaries or in areas with varying illumination crossing different materials with similar hue but different intensities. A neck pixel can be identified by examining characteristics of adjacent pixels. When a pixel has two contiguous pixels on opposite sides that are not within the corresponding token, and two contiguous pixels on opposite sides that are within the corresponding token, the pixel is defined as a neck pixel.

Figure 3D:
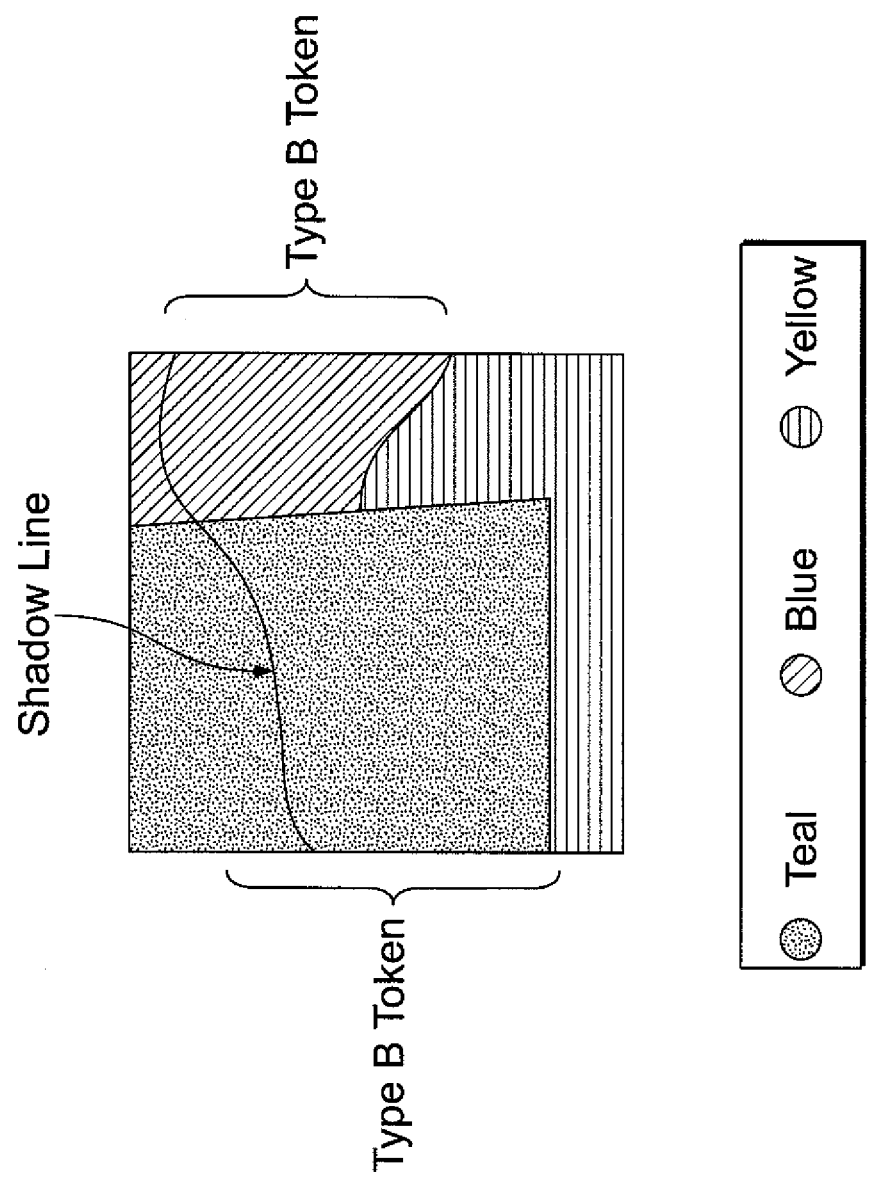
FIG. 3D shows Type B tokens, generated from the Type C tokens of FIG. 3C, according to a feature of the present invention.
Figure 3E:
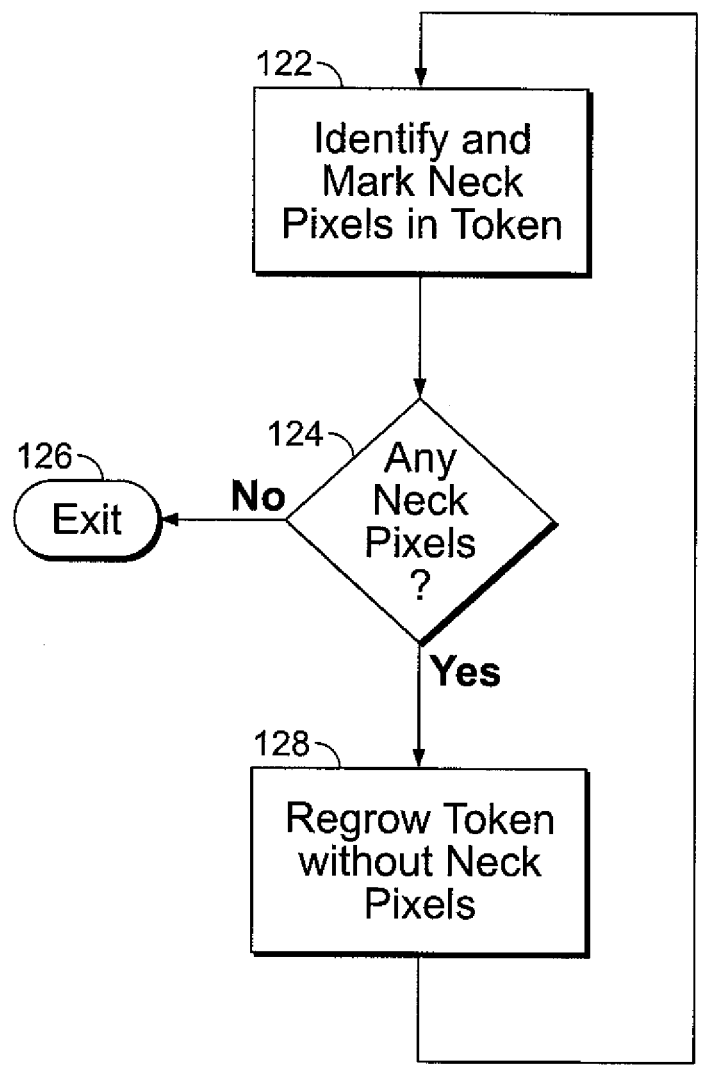
FIG. 3E is a flow chart for a routine to test Type C tokens identified by the routine of the flow chart of FIG. 3A, according to a feature of the present invention.

FIG. 3E shows a flow chart for a neck test for Type C tokens. In step 122, the CPU 12 examines each pixel of an identified token to determine whether any of the pixels under examination forms a neck. The routine of FIG. 3E can be executed as a subroutine directly after a particular token is identified during execution of the routine of FIG. 3A. All pixels identified as a neck are marked as "ungrowable." In decision block 124, the CPU 12 determines if any of the pixels were marked.

If no, the CPU 12 exits the routine of FIG. 3E and returns to the routine of FIG. 3A (step 126).

If yes, the CPU 12 proceeds to step 128 and operates to regrow the token from a seed location selected from among the unmarked pixels of the current token, as per the routine of FIG. 3A, without changing the counts for seed size and region ID. During the regrowth process, the CPU 12 does not include any pixel previously marked as ungrowable. After the token is regrown, the previously marked pixels are unmarked so that other tokens may grow into them.

Subsequent to the regrowth of the token without the previously marked pixels, the CPU 12 returns to step 122 to test the newly regrown token. Neck testing identifies Type C tokens that cross material boundaries, and regrows the identified tokens to provide single material Type C tokens suitable for use in creating Type B tokens.

FIG. 3D shows Type B tokens generated from the Type C tokens of FIG. 3C. U.S. Patent Publication 2009/0034835 teaches novel exemplary techniques for constructing Type B tokens by analyzing Type C tokens identified in an image of an image file 18. These techniques include an arbitrary boundary removal, adjacent planar token merging, and local token analysis. The techniques analyze characteristics of contiguous and/or overlapping Type C tokens, as identified, for example, via execution by the CPU 12 of the routine of FIG. 3A (each Type C token comprising a region of a single robust color measurement) to determine corresponding Type B tokens (each a region of a single material), irrespective of any varying illumination conditions existing among the respective Type C tokens used in the analysis. The Type C tokens and Type B tokens are used to implement various spatio-spectral constraints, as described above, in respect to multiple images of a same scene, according to features of the present invention.

Figure 4:
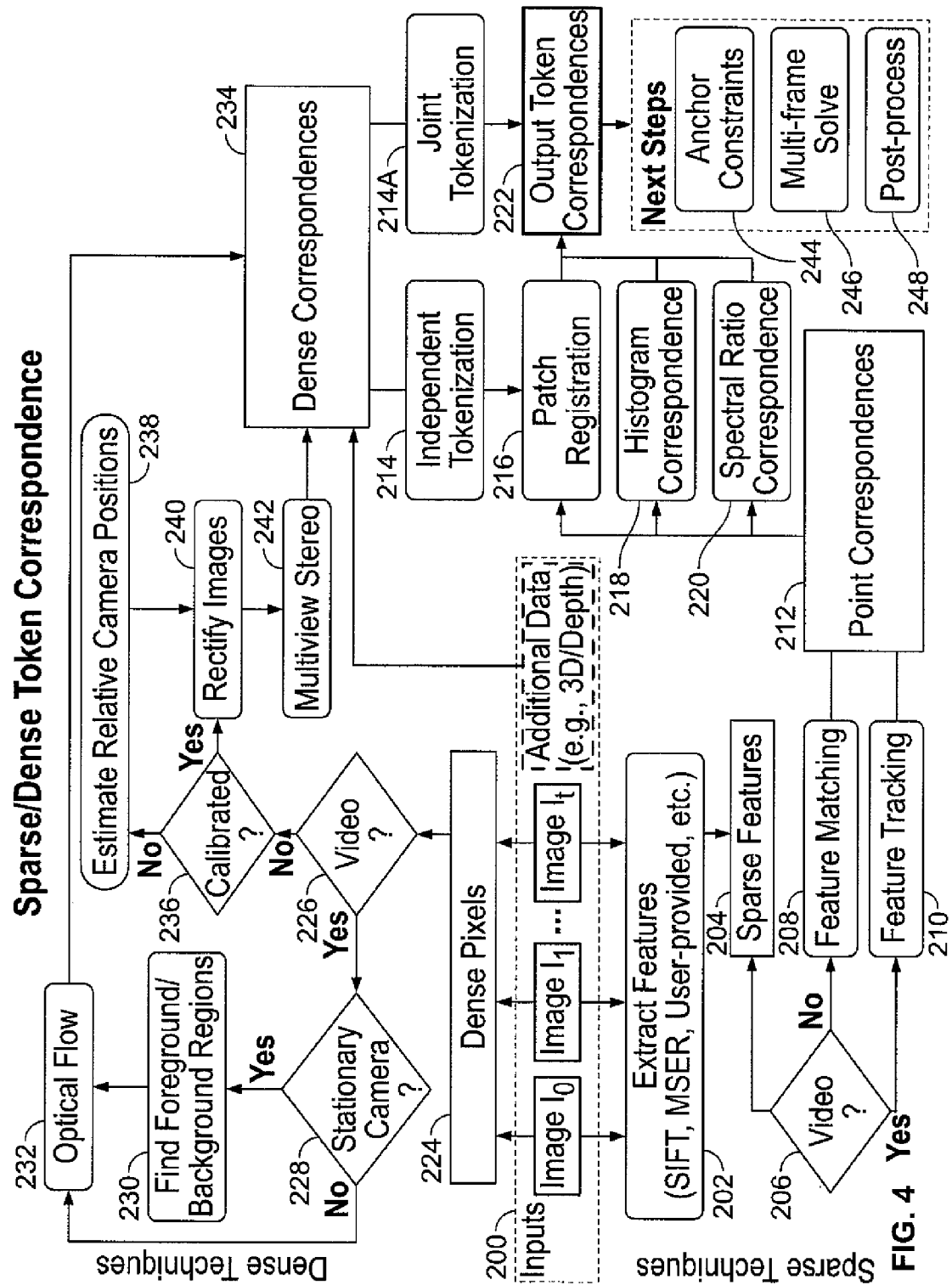
FIG. 4 is a flow chart for a routine implementing techniques to identify and use correspondence information between multiple images of a same scene, according to features of the present invention.

Referring now to FIG. 4, there is illustrated a flow chart for a routine implementing techniques to identify and use correspondence information between multiple images of a same scene, according to features of the present invention. As noted above, the techniques are executed in respect to a scenario where multiple images of a same scene are to be processed. As also noted, this scenario occurs, for example, when there are multiple images depicting multiple views of a same scene, potentially from widely-spaced viewpoints, or a sequence of images closely spaced in time and space as occurs in video data generated by a stationary or moving camera.

In either case, there are input to the CPU 12, in step 200, multiple images $I_0, I_1 \ldots I_t$ of a same scene. The scene can depict any object or group of objects, and the processing can be implemented in respect to the entire scene or any region of the scene, for example a region depicting a single object or a group of objects.

In step 200, other data, such as, for example, 3D or depth information, when available, are optionally input to the CPU 12, for use, as will be described below. The input multiple images $I_0, I_1 \ldots I_t$ can each comprise an image file 18 depicting the same scene, or regions of each image file 18 depicting a same object or group of objects of the scene. The input multiple images $I_0, I_1 \ldots I_t$ are processed by the CPU 12 according to either dense techniques or sparse techniques, as can be selected, for example, by a user via a graphical user interface.

A sparse technique identifies correspondence information as a function of a sparse, distinct set of feature matches, such as for example, point-wide matches. A dense technique identifies correspondence information as a function of pixel-wise matching. Both techniques can be implemented in a single scene, with each technique being used on different parts of an image, as can be selected by a user. For example, the sparse technique can be used when the processing is focused on a single object or group of objects in the common scene. A user can also indicate if the sequence of images is a video and if a stationary camera was used.

If, in step 200, the user selects a sparse technique, the CPU 12 proceeds to step 202. Step 202 can be implemented via a user input. In this approach, a user selects N locations of the recorded scene depicted in, for example, image $I_0$, and then selects the same N locations in a subsequent image of the scene, for example, image $I_1$, to provide N matches. The N locations selected by the user can depict an object or group of objects of interest to the user. User inputs can also be used to initialize or correct other feature matching techniques used in connection with the techniques according to exemplary embodiments of the present invention.

Alternatively, step 202 can be implemented through execution by the CPU 12 of a known feature matching technique, such as, for example, SIFT, MSER, or Harris Corners (see, for example, Harris and Stephens, "A combined corner and edge detector," *Proceedings of the 4$^{th}$ Alvey Vision Conference*, pages 147-151, 1988). These known techniques provide the ability to match points across image sequences. For example, a window corner depicted in a scene and identified by execution of a SIFT module by the CPU 12 will operate to match the same window corner in a subsequent image of the sequence. Such techniques are typically used to establish image-to-image correspondence for stitching together photographs into a larger panorama.

Upon the identification of a sparse set of matching points by operation of the CPU 12 or input by a user, the CPU 12 outputs a set of sparse features in step 204.

In decision block 206, the CPU 12 examines an indication as to whether the multiple images $I_0, I_1 \ldots I_t$ of a same scene are a video sequence or a set of still images depicting multiple views of a same scene.

If the multiple images are a set of still images, the CPU 12 proceeds to step 208. In step 208, the CPU 12 continues the known techniques to match features among the set of images. According to a feature of an exemplary embodiment of the present invention, an initial generation of intrinsic images, as described above, according to, for example, a spatio-spectral operator/constraint/solver model, is optionally performed by the CPU 12, to provide a material image for each of the multiple images $I_0, I_1 \ldots I_t$. The CPU 12 then performs the feature matching using the initial material images, for a more accurate feature matching for improved results. A second intrinsic image generation operation is then performed by the CPU 12, using correspondence information obtained from the features identified with the initial intrinsic images.

When working with images depicting faces, or another similarly restricted domain, a domain-specific technique such as, for example, Adaptive Shape Models, can be implemented to perform the feature matching task. Such a technique can be used to locate facial features such as eyes, eyebrows, noses, etc. The located features can then be used to identify corresponding points within the image.

If the result in the decision block 206 is yes (indicating a video), the CPU 12 proceeds to step 210. In a video, images are captured in close succession to one another. Accordingly, in such a case, in step 210, the CPU 12 can track the motion of points or features from frame to frame of the video. A known tracking technique can be implemented, for example, the tracking technique described by Lucas and Kanade (see B. D. Lucas and T. Kanade, "An iterative image registration technique with an application to stereo vision," *Proceedings of Imaging Understanding Workshop*, pages 121-130, 1981). The tracking can be based upon features identified using a feature matching technique, such as SIFT, as discussed above.

In either event, the output of one of step 208 or 210 provides point correspondence information (step 212) for the multiple images $I_0, I_1 \ldots I_t$. According to a feature of the exemplary embodiment of the present invention shown in the flow chart of FIG. 4, the point correspondences found in either the feature matching or feature tracking steps 208, 210, are co-related to image regions, represented by, for example, Type C tokens. In this manner, the matching or corresponding Type C tokens can be processed across the multiple images as a function of the correspondence information, in an operation to generate intrinsic images. Thus, in step 214, the CPU 12 executes the routine of FIG. 3A, as described above, to identify Type C tokens in each of the multiple images $I_0, I_1 \ldots I_t$.

In step 216, the CPU 12 operates to co-relate the point correspondences with the Type C tokens identified in step 214, via a patch registration. The best features for matching images typically exist at the intersection of multiple material regions. In an exemplary embodiment of the present invention, a fixed, relatively small patch of pixels is defined around each correspondence point in each image of the multiple image set. The size, in number of pixels, of each patch, can, for example, be set at a width twice the average distance between one matching point and the nearest point in the same image that matches a different point in another image.

A patch around one correspondence point is matched to a patch around the corresponding point of a subsequent image. Each pair of patches is registered by estimating a warping or distortion function to best match pixel-wise image data within the two patches of a pair of patches. The objective is to determine parameters for a particular class of transformations to line up the positions of the patches and/or minimize differences in pixel values within the patches. For example, the objective can be achieved by implementing an affine transformation. Affine transformations are linear transformations having parameters that are capable of capturing rotation, translation, scaling and skew, as can occur between matched features, from one image of a sequence to the next image of the sequence.

One option is to execute a routine by the CPU 12 to identify a best registration for each pair of patches. Any number of well known techniques can be implemented to perform this function, for example, the technique described in the Lucas and Kanade article cited above. The technique performs an iterative optimization to find the best transformation to provide the smallest difference in appearance between one patch and a warped version of the other patch of the pair.

A second option for patch registration is to determine a global registration for the entire image. This approach presumes that a single image warping or distortion can be used to match all or most of the patch pairs of the image sequence. Such a global registration can be a transformation that is based upon an estimate that minimizes the difference between the spatial locations of feature points in one image and the corresponding warped locations in a subsequent image of the sequence. The global solution can then be applied to each individual patch pair to register the patches.

A third option is to combine the first two options. In this approach, the CPU 12 performs a global solution as an initialization for refining the specific one of the registration transformations determined to be the best in respect to each respective individual patch pair.

Upon execution of one of the above options for registration transformation, the CPU 12 will have identified corresponding patches of pixels, one from each of two successive images of the sequence of images $I_0, I_1 \ldots I_t$, with one of the patches distorted such that each pixel in one patch depicts the same bit of scene as the corresponding pixel in the other patch of the pair. The CPU 12 can then identify the Type C tokens corresponding to each patch of the pair by analyzing the constituent pixels of the respective matched patches to identify the Type C tokens to which the constituent pixels belong, as determined through execution of the routine of FIG. 3A in step 214.

As noted above, the best features for matching images typically exist at the intersection of multiple material regions. Thus, many boundaries are probably present in the regions being analyzed. The existence of boundaries can cause errors in the matching process.

To minimize errors in the identification of Type C tokens representing matched features, the CPU 12 can be operated to determine local gradients with a simple gradient filter such as, for example, a gaussian blur filter followed by a forward difference operator, as is well known. The CPU 12 can then ignore all pixels with a gradient magnitude above a preselected threshold value. Alternatively, the CPU 12 can avoid high-gradient regions by only processing Type C tokens having more than a minimum amount of pixels (for example, 10 pixels) or identifying Type C tokens using a seed size for determining the tokens, that is above a minimum seed size (for example a 3×3 seed minimum).

In addition to the patch registration technique, the CPU 12 can selectively execute either a histogram-based correspondence technique (step 218) or a spectral-ratio-based correspondence technique (step 220), to identify token correspondences.

Figure 5:
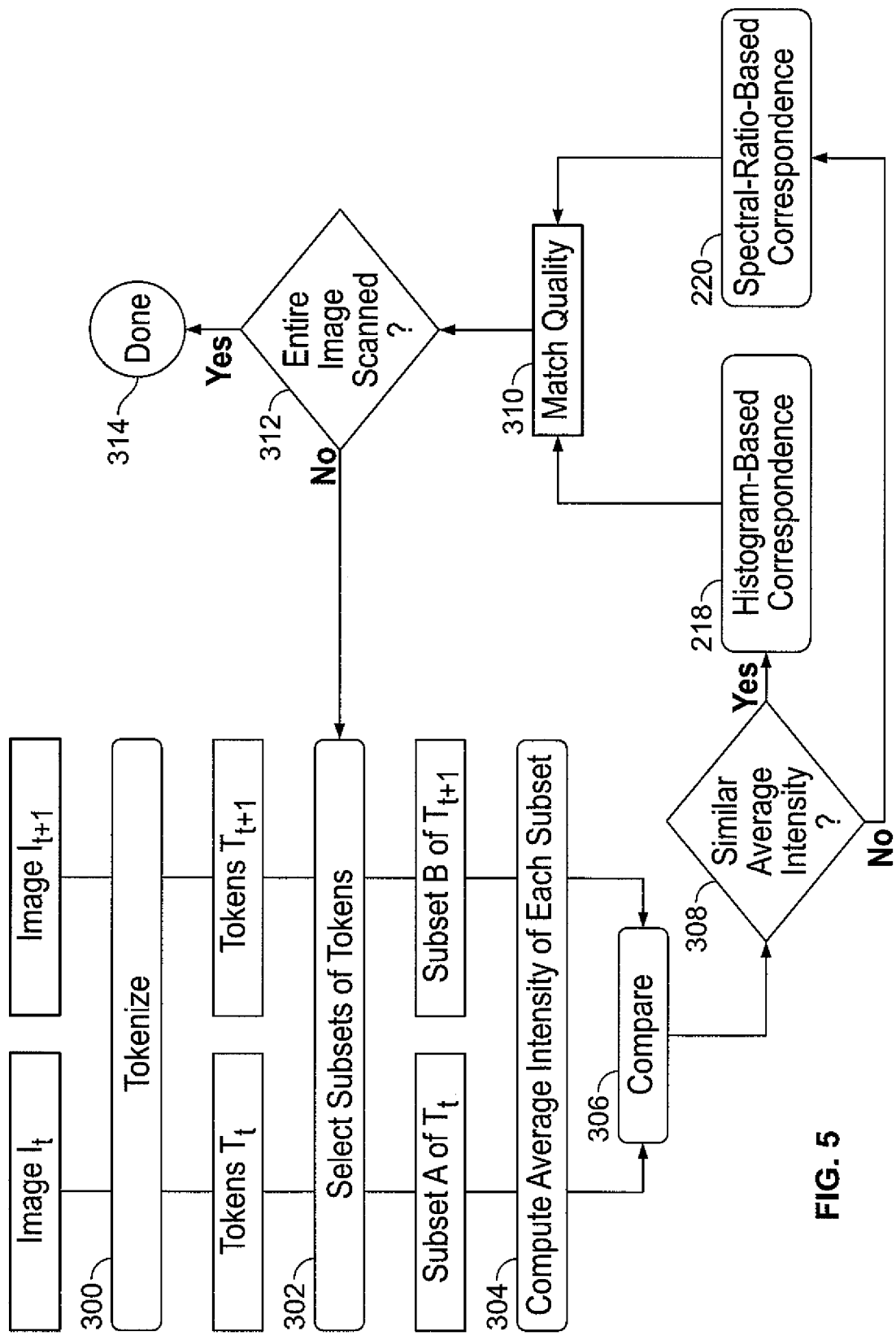
FIG. 5 is a flow chart for a routine for selecting a token correspondence technique, according to an exemplary embodiment of the present invention.

FIG. 5 is a flow chart for a routine for selecting a token correspondence technique, according to an exemplary embodiment of the present invention. In step 300, the CPU 12 outputs Type C tokens, $T_t, T_{t+1}$, for each of two images in the sequence of images, $I_t, I_{t+1}$. In step 302, the CPU 12 selects a subset of each token set, Subset A from token set $T_t$, and Subset B from token set $T_{t+1}$. The subsets include Type C tokens extending over corresponding regions, as indicated by the identified correspondence points, of the successive images used to calculate the token sets $T_t, T_{t+1}$.

In step 304, the CPU 12 operates to compute the average intensity of each subset, A and B, and then proceeds to step 306. In step 306, the CPU 12 compares the computed average intensities for the subsets. In decision block 308, the CPU 12 determines if the compare step indicates a similar average intensity between the two token subsets, A and B.

If yes, the CPU 12 proceeds to the histogram-based correspondence technique (step 218 of FIG. 4). The CPU 12 performs the histogram-based correspondence technique for the subsets A and B for a match result.

If no, the CPU 12 proceeds to the spectral-ratio-based correspondence technique (step 220 of FIG. 4). The CPU 12 performs the spectral-ratio-based correspondence technique for the subset A and B for a match result.

In step 310, the CPU 12 determines a match quality for the match result, obtained through execution of either the histogram-based technique or the spectral-ratio-based technique. If the quality meets or exceeds an acceptable level, the CPU 12 proceeds to decision block 312. If the quality does not meet the acceptable level, a default, for example, the patch registration technique, can be executed by the CPU 12 before proceeding to the decision block 312.

In the decision block 312, the CPU 12 determines if the entire image pair $I_t$, $I_{t+1}$, has been scanned.

If no, the CPU 12 returns to step 302, and selects another pair of token subsets, representing another set of correspondence points, for analysis.

If yes, the CPU 12 outputs the token correspondences (step 222 in FIG. 4).

According to an exemplary embodiment of the present invention, the histogram-based token correspondence technique (step 218 of FIG. 4) is based upon a color transform between corresponding patches. As noted above, the histogram-based technique is selected for execution by the CPU 12 if the compare step (step 306) indicates that there is a similar average intensity between two token subsets, A and B. This scenario will be found, for example, if a collection of materials in image $I_t$, have similar illumination in image $I_{t+1}$.

When assuming that two patches depict the same feature of a scene, as in a point correspondence determination, then the potential differences between the two patches can be expressed by differences in illumination, exposure and camera white balance. In such a case, a simple color transform can be expressed by the following:

$$\begin{bmatrix} c_{1R} \\ c_{1G} \\ c_{1B} \end{bmatrix} = \begin{bmatrix} T_{11} & T_{12} & T_{13} \\ T_{21} & T_{22} & T_{23} \\ T_{31} & T_{32} & T_{33} \end{bmatrix} \begin{bmatrix} c_{2R} \\ c_{2G} \\ c_{2B} \end{bmatrix}$$

$$\vec{c_1} = T\vec{c_2}$$

In the above mathematical equation, the colors represented by $c_1$ and $c_2$ are the measured colors (stored as pixels in the respective image files 18), one from each patch of the pair being matched, expressed as (R, G, B) color vectors. T is a 3×3 transformation matrix to map the colors from $c_2$ and $c_1$. In the simplest case, T is a diagonal matrix, as follows:

$$\begin{bmatrix} c_{1R} \\ c_{1G} \\ c_{1B} \end{bmatrix} = \begin{bmatrix} T_{11} & 0 & 0 \\ 0 & T_{22} & 0 \\ 0 & 0 & T_{33} \end{bmatrix} \begin{bmatrix} c_{2R} \\ c_{2G} \\ c_{2B} \end{bmatrix}$$

An equivalent for the above matrix equation can be expressed by the following three equations:

$c_{1R} = T_{11} c_{2R}$ $c_{1G} = T_{22} c_{2G}$ $c_{1B} = T_{33} c_{2B}$

A set of values for the matrix T can be determined by operating the CPU 12 to examine the colors of each patch of the pair, and finding a dominant transform that causes as many colors in the second patch to be close to a color in the first patch as possible, and also causes as many colors in the first patch to have a transformed color from the second patch that is close to each respective color of the first patch, as possible.

In an exemplary embodiment of the present invention, a known RANSAC technique can be implemented to determine the dominant transform. See, for example, Martin A. Fischer and Robert C. Bolles, "Random Sample Consensus: A Paradigm for Model Fitting with Application to Image Analysis and Automated Cartography," Comm. of the ACM 24: 381395 (June 1981).

According to a further feature of the present invention, the transform can be restricted based upon the circumstances of the recording of the scene depicted in the sequence of images. For example, in the case of two images that are spatially separated, but recorded close in time, the spectral properties of surfaces and illuminants in the scene can be expected to remain relatively constant. Accordingly, the matrix T can be restricted such that:

$$\forall \vec{c}, \left\| \frac{\vec{c}}{\|\vec{c}\|} - \frac{T\vec{c}}{\|T\vec{c}\|} \right\| < \epsilon$$

for a specified $\epsilon$.

In this case, the restriction specifies that the transformation matrix T be close to a simple scalar multiple. That is, the overall brightness of the color of a patch can change significantly, from image to image, but the relative magnitudes of, for example, the color bands R, G and B, should remain similar. Moreover, the transformation between a pair of patches can be regularized, by enforcing continuity or smoothness among transformations for pairs in close proximity to one another.

Once a transformation matrix T is determined, the CPU 12 can find color correspondence between a pair of patches in images $I_t$, $I_{t+1}$, respectively. For each Type C token including pixels of a first patch in image $I_t$, the CPU 12 can locate a corresponding Type C token in the subsequent image, $I_{t+1}$, having constituent pixels from the second patch of the matched pair, and so on. To minimize errors that may be caused by boundaries, the methods for avoiding boundaries described above in respect to the patch registration technique can be implemented.

In the case where execution of step 306 indicates that there is not a similar average intensity between two token subsets, A and B, the CPU 12 selects the spectral-ratio-based correspondence technique for locating token correspondences (step 220 in FIG. 4). Such a situation generally occurs where two images are spatially close, but separated in time. In that circumstance, the materials in images $I_t$, $I_{t+1}$, can be the same, but the illumination spectra over all or part of the common scene can be significantly different between the images, for example, due to changing shadows.

A fundamental teaching of the Friedhoff Patents is that an image comprises two components, material and illumination. The illumination comprises ambient and incident or direct illumination. Thus, the CPU 12 can be operated to differentiate between material aspects and illumination flux through recognition of a spectral shift caused by the interplay between the incident or direct illuminant and the ambient illuminant. The spectra for the incident illuminant and the ambient illuminant can be different from one another. As taught by the Friedhoff Patents, a spectral shift caused by a shadow, i.e., a decrease of the intensity of the incident illuminant, will be substantially invariant over different materials present in a scene depicted in an image.

Pursuant to the teachings of the Friedhoff Patents, spectral shift information is represented by an illuminant ratio, or a characteristic spectral ratio formed by the interplay of the incident illuminant and the ambient illuminant. A spectral ratio is a ratio based upon a difference in color or intensities between two areas of a scene depicted in an image, which may be caused by different materials, an illumination change or both. Such a characteristic or global spectral ratio for an image sequence can be used in the circumstance of an image sequence wherein the images are spatially close, but the illumination spectra over all or part of a common scene is significantly different between the images of the sequence, for example, due to changing shadows, as discussed above.

A normalized characteristic spectral ratio of the ambient and incident illumination constrains the relationship between the appearance of surfaces when shadowed and lit with some level of incident illumination. A normalized spectral ratio is expressed by:

$$\hat{S} = \frac{\frac{dark_i}{bright_j - dark_i}}{\left|\frac{dark_i}{bright_j - dark_i}\right|}$$

wherein dark is a pixel of a material in shadow and bright is a lit pixel of the same material.

Pursuant to a feature of the present invention, spectral ratio information is used to match tokens in the spectral-ratio-based correspondence technique. For example, in the situation of a collection of Bright tokens in a first image of an image sequence, and a collection of Dark tokens from a second image of the sequence, a normalized spectral ratio can be calculated, based upon the bright/dark collections of tokens, and analyzed relative to the characteristic, global spectral ratio for the image sequence.

A map providing a measure of similarity of materials represented by the two collections (dark and bright) is the squared error between the global normalized spectral ratio and the normalized spectral ratio calculated from the bright/dark collections. This relationship is expressed as follows:

$$\sum_{(i,j) \in M} (\hat{S}_g - \hat{S}_{(i,j)})^2 = \sum_{(i,j) \in M} \left(\hat{S}_g - \frac{\frac{dark_i}{bright_j - dark_i}}{\left|\frac{dark_i}{bright_j - dark_i}\right|}\right)^2$$

The mapping M should preserve the ordering of brightness within a single color channel. Thus, if the tokens in the dark collection are ordered from darkest to brightest, then if dark token i maps to bright token j, then dark token i+1 must map to bright token k, where k≥j. A known technique such as dynamic time warping can be implemented to generate a map to provide the correspondence based upon spectral ratio information.

A global spectral ratio for use in generating the error map can be calculated, for example, as follows:

A user identifies a same material in shadowed and lit regions and calculates a characteristic spectral ratio as a function of pixel color values from the identified regions.

An automatic technique for determining a characteristic spectral ratio is executed by the CPU 12, such as, for example, the automatic technique disclosed in U.S. Pat. No. 7,672,530.

Operate the CPU 12 to sample dark and bright pixels and use the samples to calculate a plausible characteristic spectral ratio.

Operate the CPU 12 to sample dark and bright pixels and use the samples in a technique such as mean shift to identify a characteristic spectral ratio.

In any event, after execution of at least one steps of 216, 218 and/or 220, the CPU 12 outputs token correspondence information (step 222).

Returning to step 200, if the user selects a dense technique, the CPU 12 proceeds to step 224. In step 224, the CPU 12 obtains the image files 18 for the sequence of images $I_0$, $I_1 \ldots I_t$, from the memory 16. In decision block 226, the CPU 12 examines an indication as to whether the multiple images $I_0, I_1 \ldots I_t$ of a same scene are a video sequence or a set of still images depicting multiple views of a same scene.

If the multiple images are from a video sequence, the CPU 12 proceeds to decision block 228. In decision block 228, the CPU 12 determines if the sequence of images was recorded by a stationary camera.

If yes, the CPU 12 proceeds to step 230. In step 230, the CPU 12 identifies foreground objects such as objects moving through the recorded scene. The sparse techniques described above can be implemented to determine correspondence information for the foreground objects, either in parallel to the finding of correspondence information for the scene, or in an independent operation. The CPU 12 then proceeds to step 232.

If no, the CPU 12 proceeds directly to step 232. In step 232, the CPU 12 implements an optical flow operation. For example, a feature tracking technique, as executed by the CPU 12 in step 210, is implemented such that the CPU 12 tracks, in this instance, the motion of each pixel from image file 18 to image file 18, for the sequence of images $I_0, I_1 \ldots I_t$. The result is pixel-by-pixel dense correspondences (step 234).

If the decision block 226 indicates a set of still images depicting multiple views of a same scene, the CPU 12 proceeds to decision block 236. In decision block 236, the CPU 12 determines if the images are calibrated, in terms of the relative position of the camera during the recording of the images.

If no, the CPU 12 proceeds to step 238. In step 238, the CPU 12 estimates the relative positions of the camera during recording of the sequence of positions, then proceeds to step 240.

If yes, the CPU 12 proceeds directly to step 240. In step 240, the CPU 12 operates to generate rectified images, for examples, by executing the technique based upon the Fundamental Matrix (see, Q. T. Luong and O. D. Faugeras, "The Fundamental Matrix, Theory, Algorithms, and Stability Analysis," *International Journal of Computer Vision*, 17(1), pages 43-75, 1996).

In step 242, the CPU 12 uses the rectified images to determine dense, pixel-wise correspondence, by executing any known technique for stereo matching, for two or more views of an image, for output (step 234).

As noted in step 200, additional data, such as, for example, 3D or depth information, can be input to the CPU 12, Known matching algorithms can be used when 3D or depth information is available, to provide the dense correspondences output in step 234.

As in the case of the use of sparse correspondence techniques, the CPU 12 operates to co-relate the pixel-wise, dense correspondences with Type C tokens, for use in the generation of intrinsic images (step 222). One option is to co-relate the pixel correspondences with Type C tokens identified by the CPU 12 during execution of step 214, according to the routine of FIG. 3A. All such Type C tokens having constituent pixels linked by the dense correspondences are marked as matching tokens.

In a second option, the CPU 12 performs a joint tokenization in step 214A. According to the routine of FIG. 3A, each Type C token is grown from pixels that neighbor a seed of pixels, all in the same image. In step 214A, the routine is adjusted to use the pixel-wise, dense correspondences to grow tokens so as to include corresponding pixels in previous and subsequent images of the sequence of images. In practice, the previous and subsequent images can be warped based on dense correspondence such that the pixels of the images are aligned to a reference image of the sequence, and neighbors can be located at the same spatial locations across the images.

Figure 6:
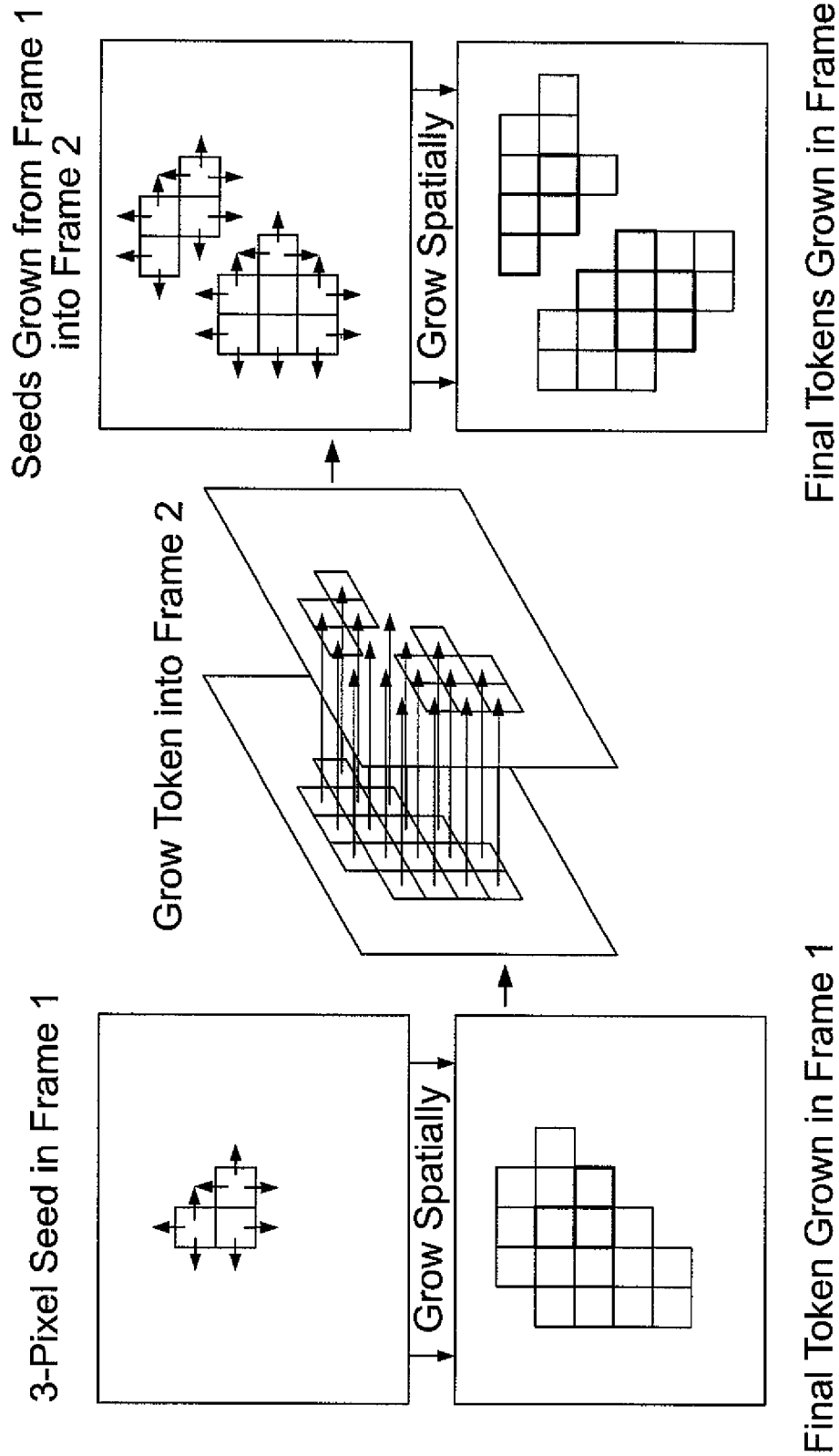
FIG. 6 is an illustration of a joint tokenization technique according to a feature of the present invention.

In the case of a video, successive images are closely spaced in time, and it can be assumed that there is approximately zero motion between frames. Accordingly, tokens can be grown forward and backward in time, across the images of the video, as shown in FIG. 6. FIG. 6 illustrates a joint tokenization technique according to a feature of the present invention.

Upon completion of step 222, the CPU utilizes the token correspondences during execution of the intrinsic image generation according to the spatio-spectral operator/constraint/solver model described above. The CPU 12 can be operated to execute one or more of the anchor constraint, multi-image solve and post processing techniques, in steps 244, 246 and 248, respectively.

If the anchor constraint technique of step 244 is selected, the CPU 12 operates to implement a constraint wherein the material reflectance of a token in a second image is constrained to the material reflectance of the corresponding token in a first image.

Figure 7:
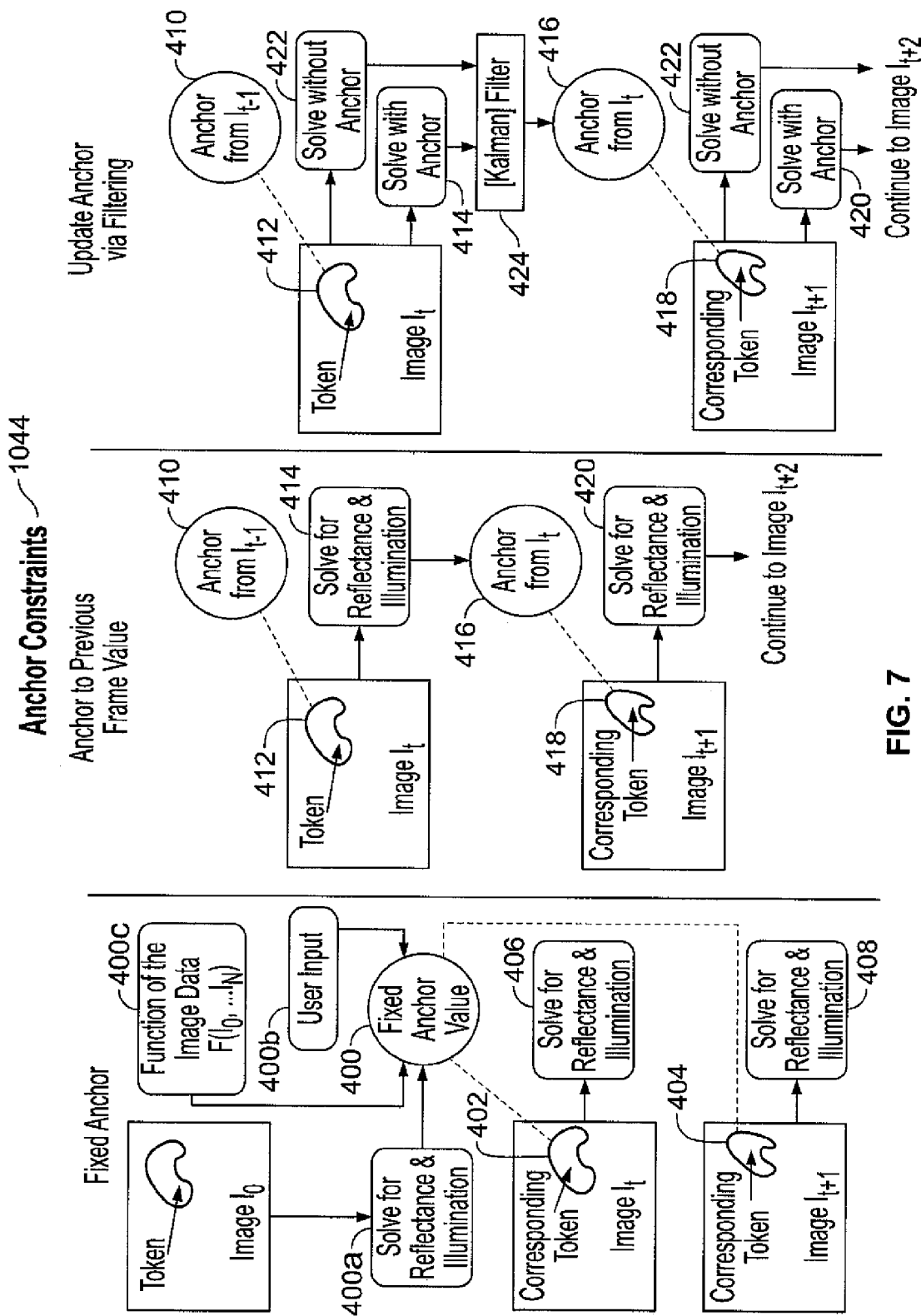
FIG. 7 is a flow chart for routines for implementing an anchor constraint in connection with the routine of FIG. 4, according to a feature of the present invention.

In a first implementation of the anchor constraint, a fixed anchor is used, as shown in the fixed anchor illustration of FIG. 7. As shown in FIG. 7, in the fixed anchor approach, a fixed anchor value (step 400) is calculated or specified for use in the generation of intrinsic images. The fixed value for the anchor can be set according to a number of different methods, for example:

1) Solve for a first image ($I_0$) by itself and use the determined reflectance as the fixed anchor for all subsequent images (via the token correspondences) (400a);
2) Have a user provide an input value indicating the reflectance of one or more tokens which will then be used to anchor all subsequent images (via the token correspondences) (400b); or
3) Analyze the pixel values for a set of corresponding tokens and take some function of the set, such as, for example, max, 90th percentile, median, or mean (400c).

A solve, in successive images $I_t$, $I_{t+1}$, is then performed by the CPU 12 in steps 406, 408, for corresponding token, 402, 404 of the sequence of corresponding tokens, as a function of the fixed anchor value 400 for the material reflectance, as set in one of steps 400a, 400b or 400c.

In a second implementation of the anchor constraint, an anchor based upon the material reflectance calculated from a previous image of the sequence is used in a solve for a current image of the sequence. As shown in FIG. 7, an anchor 410 from the solve for the previous image $I_{t+1}$ is used in the solve for a token 412 in the current image $I_t$ (step 414). The material reflectance calculated in the solve of step 414 is then used as the anchor 416 for the solve for a corresponding token 418 in a next image $I_{t+1}$ (step 420), and so on.

In a third implementation for the anchor constraint, an updated anchor via a filter is used. As shown in FIG. 7, the previous anchor approach is implemented (steps 410-420). In addition, at each image of the sequence, a solve (step 422) is performed without the use of the anchor. For example, a same-material constraint can be executed by the CPU 12, as described above, together with a smooth or same illumination constraint. The results of each calculation (with and without the anchor constraint) are input to a filter such as a Kalman filter, to update the value of the constraint over time (step 424). The objective in the filter-based approach is solving each frame independently (without anchors tying it to values from previous solves) in order to obtain an independent estimate of the material reflectance values of the tokens to be anchored. This provides a tie between images through time in a non-rigid way: the reflectance of a corresponding token may change across a sequence of images, but it will change slowly, in a principled manner.

Figure 8:
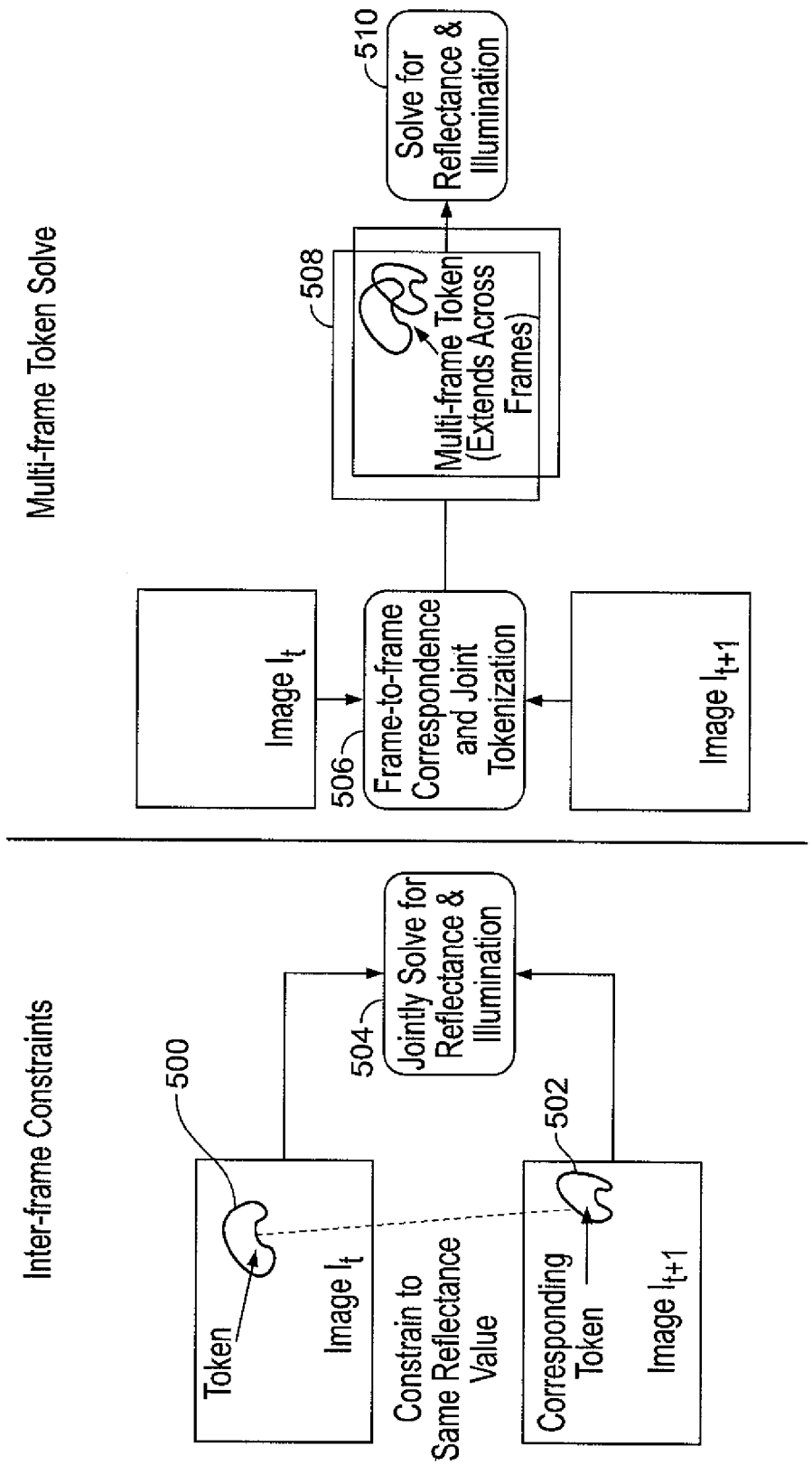
FIG. 8 is a flow chart for routines for implementing multi-frame solves in connection with the routine of FIG. 4, according to a feature of the present invention.

FIG. 8 is a flow chart for routines for implementing multi-frame solves in connection with the routine of FIG. 4, according to a feature of the present invention (step 246 in FIG. 4). In one option for the multi-frame approach, all of the Type C tokens for two or more of the images of a sequence, are subject to a solve at one time. For example, a same-material reflectance constraint can be imposed on corresponding tokens 500, 502 in successive images $I_t$, $I_{t+1}$, of a sequence (step 504).

In a second option, in step 506 a joint tokenization such as performed in step 214A, is executed by the CPU 12 to provide multi-frame corresponding tokens (step 508), for successive images $I_t$, $I_{t+1}$. A solve can be performed relative to the multi-frame corresponding tokens (step 510). The solve can be based upon, for example, a combination of same or smooth illumination constraints, same material reflectance constraints, and anchor constraints. The objective is to apply the various constraints together and passed into the solve step. The solve step, implemented, for example, as a least-squares linear systems of equations solve, provides power by allowing constraints which do not completely agree to be simultaneously maximally satisfied.

Figure 9:
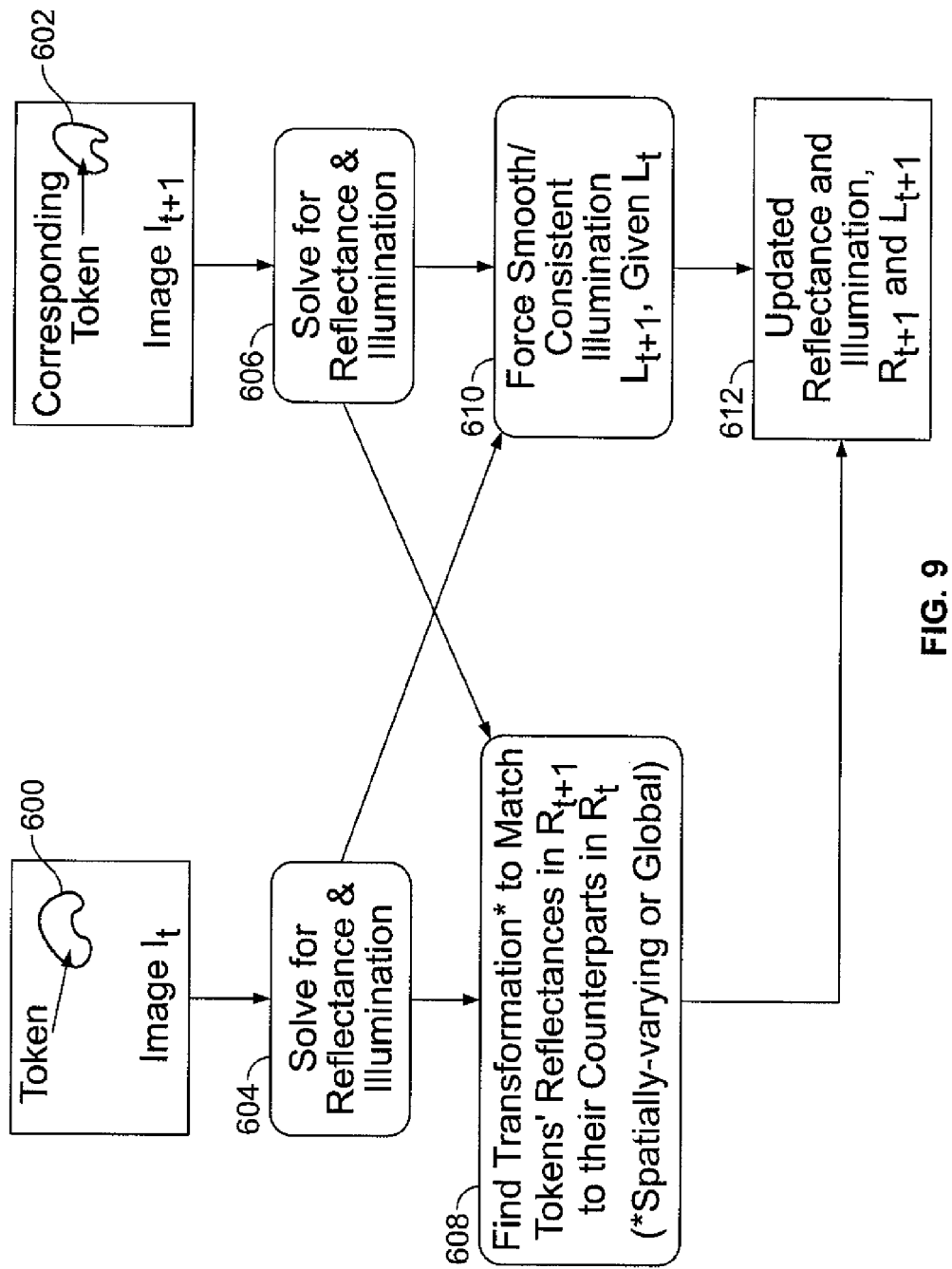
FIG. 9 is a flow chart for a routine for implementing a post-processing technique for use in connection with the routine of FIG. 4, according to a feature of the present invention.

FIG. 9 is a flow chart for a routine for implementing a post-processing technique for use in connection with the routine of FIG. 4, according to a feature of the present invention (step 248 in FIG. 4). In the post-processing technique, a solve is performed by the CPU 12 independently for each image of the sequence, for example, images $I_t$, $I_{t+1}$, to determine, for example, material reflectance $R_t$, and illumination $L_t$, for token 600 of image $I_t$, and material reflectance $R_{t+1}$, and illumination $L_{t+1}$, for token 602 of image $I_{t+1}$, in steps 604, 606, respectively.

After performance of the independent solves, the CPU 12 performs post-processing operations, such as, for example, the finding of a transformation to match the reflectance of token 602 to the reflectance of token 600 (step 608) and the forcing of a smooth, consistent illumination for token 602, over time, relative to the illumination for token 600 (step 610). The results are output in step 612 as an updated solve for reflectance and illumination for token 602, as a function of the solve for the corresponding token 600 of a previous image from the sequence, and so on.

In step 608, the CPU 12 determines a transformation T such that $R_t = T R_{t+1}$, wherein T is a diagonal 3×3 matrix. The matrix T can be global, that is an average applied across all pairs of corresponding tokens, or T can be varied spatially, recording T at the location of each token pair, and blending it to the rest of the image. In the case of a spatially varying T, the blending can be done smoothly or in a manner such that edges in T are allowed when there are corresponding edges in the reflectance image. Additionally, in the spatially varying version of T, the matrix can be blurred in image space so that it varies smoothly. A gaussian blur can be implemented with a specified σ, or, as an alternative, an edge-preserving blurring filter such as a bilateral filter can be used.

In step 610, the CPU 12 can operate to enforce illumination smoothness from image to image, since illumination tends to vary slowly spatially, that can also be enforced in time.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for processing an image, comprising the steps of:
   providing a sequence of image files depicting images of a same scene, in a computer memory;
   determining correspondence information relevant to the same scene across the sequence of images; and
   generating individual intrinsic images for each one of the sequence of images, as a function of the correspondence information.

2. The method of claim 1 including the further step of identifying token regions in each image of the sequence of images, and wherein the correspondence information comprises matching token information across the sequence of images.

3. The method of claim 1 wherein the step of determining correspondence information is carried out by executing a sparse correspondence technique.

4. The method of claim 1 wherein the step of determining correspondence information is carried out by executing a dense correspondence technique.

5. The method of claim 1 wherein the step of generating individual intrinsic images for each one of the sequence of images, as a function of the correspondence information is carried out by executing an anchor constraint.

6. The method of claim 1 wherein the step of generating individual intrinsic images for each one of the sequence of images, as a function of the correspondence information is carried out by executing a multi-image solve technique.

7. The method of claim 1 wherein the step of individual generating intrinsic images for each one the sequence of images, as a function of the correspondence information is carried out by executing an intrinsic image process according to a spatio-spectral operator/constraint/solver model and performing post processing techniques on generated intrinsic images using the correspondence information.

8. The method of claim 3 wherein the sparse correspondence technique is selected from the group consisting of a patch registration technique, a histogram-based correspondence technique and a spectral-ratio-based correspondence technique.

9. A computer system which comprises:
   a CPU; and
   a memory storing a sequence of image files depicting images of a same scene;
   the CPU arranged and configured to execute a routine to determine correspondence information relevant to the same scene across the sequence of images, and generate individual intrinsic images for each one of the sequence of images, as a function of the correspondence information.

10. A computer program product, disposed on a non-transitory computer readable media, the product including computer executable process steps operable to control a computer to: provide a sequence of image files depicting images of a same scene, in a computer memory, determine correspondence information relevant to the same scene across the sequence of images, and generate individual intrinsic images for each one of the sequence of images, as a function of the correspondence information.

11. The computer program product of claim 10 including the further process step of identifying token regions in each image of the sequence of images, and wherein the correspondence information comprises matching token information across the sequence of images.

12. The computer program product of claim 10 wherein the process step of determining correspondence information is carried out by executing a sparse correspondence technique.

13. The computer program product of claim 10 wherein the process step of determining correspondence information is carried out by executing a dense correspondence technique.

14. The computer program product of claim 10 wherein the process step of generating individual intrinsic images for each one of the sequence of images, as a function of the correspondence information is carried out by executing an anchor constraint.

15. The computer program product of claim 10 wherein the process step of generating individual intrinsic images for each one of the sequence of images, as a function of the correspondence information is carried out by executing a multi-image solve technique.

16. The computer program product of claim 10 wherein the process step of generating individual intrinsic images for each one of the sequence of images, as a function of the correspondence information is carried out by executing an intrinsic image process according to a spatio-spectral operator/constraint/solver model and performing post processing techniques on generated intrinsic images using the correspondence information.

17. The computer program product of claim 12 wherein the sparse correspondence technique is selected from the group consisting of a patch registration technique, a histogram-based correspondence technique and a spectral-ratio-based correspondence technique.

18. The method of claim 1 wherein the same scene comprises an object.

19. The method of claim 18 wherein the object is preselected.

20. The computer system of claim 9 wherein the same scene comprises an object.

21. The computer system of claim 20 wherein the object is preselected.

22. The computer program product of claim 10 wherein the same scene comprises an object.

23. The computer program product of claim 22 wherein the object is preselected.

* * * * *